United States Patent [19]

Salt

[11] Patent Number: 5,711,068
[45] Date of Patent: Jan. 27, 1998

[54] METHOD OF MANUFACTURING A BLADE

[75] Inventor: Frank Trevor Salt, Burton on Trent, England

[73] Assignee: Rolls-Royce plc, London, England

[21] Appl. No.: 735,106

[22] Filed: Oct. 22, 1996

[30] Foreign Application Priority Data

Oct. 28, 1995 [GB] United Kingdom ............... 9522112

[51] Int. Cl.$^6$ .................................................. B23P 15/00
[52] U.S. Cl. .......................... 29/889.1; 29/889.72
[58] Field of Search .................... 29/889.1, 889.7, 29/889.72, 889.721, 889.722, 402.08; 228/119; 416/241

[56] References Cited

U.S. PATENT DOCUMENTS

| | | | |
|---|---|---|---|
| 3,004,607 | 10/1961 | Lunnaberg et al. | 29/889.7 |
| 3,588,980 | 6/1971 | Cogan. | |
| 3,628,226 | 12/1971 | Nelson et al. . | |
| 4,726,101 | 2/1988 | Draghi et al. | 29/889.1 |
| 5,018,271 | 5/1991 | Bailey et al. | 29/889.7 |
| 5,123,814 | 6/1992 | Burdiek | 29/889.71 |
| 5,222,297 | 6/1993 | Graff et al. | 29/889.71 |
| 5,269,658 | 12/1993 | Carlson et al. | 416/229 R |
| 5,479,704 | 1/1996 | Richter et al. | 29/889.1 |

FOREIGN PATENT DOCUMENTS 2 086 772   5/1982   United Kingdom .

*Primary Examiner*—Irene Cuda
*Attorney, Agent, or Firm*—Cushman Darby & Cushman IP Group of Pillsbury Madison & Sutro LLP

[57] ABSTRACT

A preform of a superplastically formed fan blade for a turbofan aeroengine, includes two blade flank components and a core sheet sandwiched between them. A manufacturing process for producing the blade preforms comprises cutting titanium plate material into rectangular prism shaped pieces of suitable length and thickness. Each piece is cut lengthwise along an inclined plane to form two separate tapered panels which become the blade flank components. After machining to a three dimensional profile on the cut faces, pairs of the blade flank components are stacked together with their uncut surfaces confronting each other, the core sheet being placed between them. The blade flank components are then diffusion bonded to the core sheet in a predefined pattern so as to create the blade preform with an internal structure defined by the bonding pattern. The blade preform can then be superplastically formed and finish machined to produce the fan blade.

12 Claims, 4 Drawing Sheets

METHOD OF MANUFACTURING A BLADE

The present invention relates to a manufacturing process for the production of diffusion bonded preforms of hollow aerofoil shaped blades from metal plate, or slab material, preparatory to superplastically forming them into hollow blade shapes. It is particularly applicable to The production of fan blades for turbofan engines, but is also applicable to the production of other types of rotor blades or stator vanes for turbomachines, or to propellers.

Diffusion bonding together of a stack of metal parts, such as laminations or sheets, over selected areas of their interfaces, followed by superplastic forming of the resulting integral structure by gas inflation between dies, has been identified as a cost and weight effective method of manufacture for the fan blades of turbofan aeroengines. However, the route by which the component parts of the stack have been manufactured also has a strong influence on the overall cost and structural integrity of the finished fan blade. For instance, during any machining or forming processes prior to incorporation of the components into the stack, it is important to minimise waste of the sheet, plate or slab material from which the components have been made.

Accordingly, the present invention provides in its broadest terms a manufacturing process for the production of a preform of a hollow aerofoil shaped blade, the preform being a diffusion bonded stack of metallic blade components including first and second blade flank components, each flank component comprising a root portion which in the finished blade serves for fixing the blade in a rotor disc and an aerofoil portion extending from the root portion to a radially outer tip, the process for producing the preforms comprising the steps of (a) producing pieces of metallic material in generally parallelepiped form, the parallelepipeds each having a length of at least the length of the preform from root to tip, (b) cutting each parallelepiped lengthwise along an inclined plane to form two separate panels of longitudinally tapering thickness, (c) producing blade flank components from the panels by shaping the panels on their cut surfaces, or their uncut surfaces, to form a three dimensional profile thereon which in the finished blade will produce a hollow interior of the blade, (d) assembling the stack of blade components with the surfaces of the blade flank components which were uncut in step (b) facing each other, and (e) diffusion bonding the components in the stack together in a predefined bonding pattern thereby to create the blade preform with an internal structure defined by the bonding pattern.

The preform so produced can be inflated at superplastic forming temperatures by injecting inert gas into its internal structure to produce the hollow aerofoil blade shape. The three dimensional profiling of the sides in step (c) above enables the production of blade preforms which do not require further machining before inflation.

The word "blade" in these statements of invention, and in the claims appended to this specification, is used in a non-limiting sense and should be construed as covering propulsor, compressor and turbine rotor blades, or stator vanes.

In finished rotor blades, there are transitional shoulders where the aerofoils meet the thicker root portions of the blades. Consequently, it is convenient if there is an additional step between steps (a) and (b), comprising machining two channels on each parallelepiped, one channel being machined near each end of the parallelepiped on opposed sides thereof, the channels running widthwise of the parallelepiped thereby to preliminarily define the shoulders of the root portions of the blade flank components. We make the channels wide enough to allow a suitable cutting means, such as a band saw, to enter one of the channels, cut the parallelepiped lengthwise along the inclined plane, as described above, and emerge into the channel on the other side of the parallelepiped.

Preferably, the parallelepipeds each have a thickness of at least the maximum thickness of the root portions of the blade flank components immediately before step (e). In a preferred embodiment, for reasons of economy of production and the improved mechanical properties of thin metallic plate relative to thick metallic plate, the parallelepipeds each have a thickness of substantially less than half the thickness of the root portions of the preform after step (e), the required extra thickness of the preform root portions being obtained by assembling at least one further component into the stack of blade components in step (d), the at least one further component comprising at least one plate superimposed on the root portion of at least one of the blade flank components, the at least one plate then being diffusion bonded to the root portion during step (e).

In order to produce blade preforms capable of being formed into a hollow blade with a reinforcing core structure for high strength and integrity, we place a superplastically formable metallic sheet between the two blade flank components in step (d), the blade flank components then being diffusion bonded to opposing sides of the sheet during step (e).

The present invention also provides a manufacturing process for the production of a preform of a hollow aerofoil shaped blade, the preform being a diffusion bonded stack of metallic blade components including first and second blade flank components, each flank component comprising a root portion which in the finished blade serves for fixing the blade in a rotor disc and an aerofoil portion extending from the root portion to a radially outer tip, the process for producing the preforms comprising the steps of (a) producing pieces of metallic material in generally parallelepiped form, the parallelepipeds each having a length of at least the length of the preform from root to tip, (b) cutting each parallelepiped lengthwise along an inclined plane to form two separate panels of longitudinally tapering thickness, (c) producing blade flank components from the panels by shaping the panels on their cut surfaces to form a three dimensional profile thereon which in the finished blade will produce a hollow interior of the blade, (d) assembling the stack of blade components with the surfaces of the blade flank components which were uncut in step (b) facing each other, and (e) diffusion bonding the components in the stack together in a predefined bonding pattern thereby to create the blade preform with an internal structure defined by the bonding pattern.

Exemplary embodiments of the present invention will now be described with reference to the accompanying drawings, in which.

Figure 1:
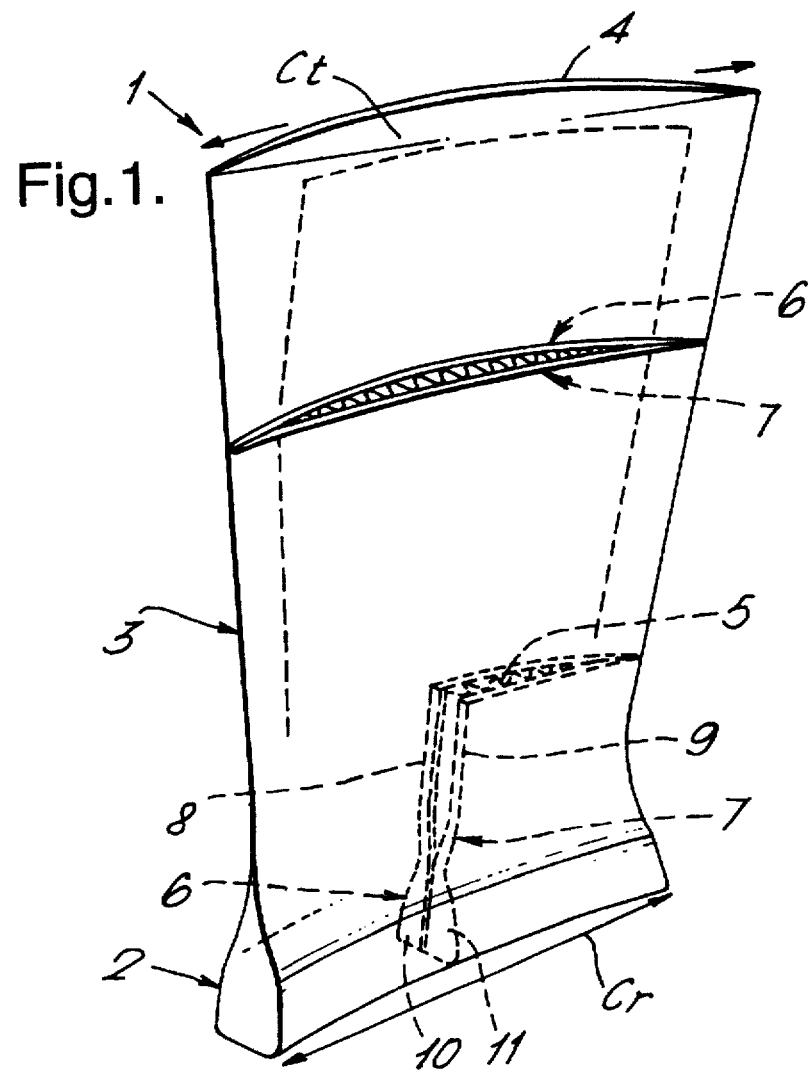
FIG. 1 is a pictorial sketch of an axial flow fan blade for a turbofan aeroengine, a partial radial cross section and a chordwise cross section of the blade being superimposed to show internal structure.

The fan blade 1 shown in FIG. 1 is a large metallic (preferably titanium alloy) aerofoil shaped rotary component. It comprises a root portion 2 for fixing the blade in a rotor disc (not shown) and an aerofoil portion 3 which acts to energise air before it passes to further components of the turbofan downstream of the fan blade. The aerofoil portion 3 exhibits a progressive twist between its radially inner extremity where it joins the root portion 2 and its radially outer extremity or tip 4. It has a wider chord dimension $C_t$ at the tip of the blade than the chord dimension $C_r$ near the root 2.

The aerofoil portion 3 of the blade 1 is hollow over most of its extent, but is internally cross braced for maximum strength and integrity by a warren girder type of structure. This is constituted by an expanded metallic core sheet 5 as described below.

The blade is made from a first blade flank component 6, a second blade flank component 7 and the core sheet 5 which is sandwiched between the first and second flank components 6 and 7. Each blade flank component 6,7 comprises an aerofoil part 8,9 and a root part 10,11 and together they comprise the entire external shape of the blade 1. Although for the sake of illustrative convenience the finished fan blade 1 is shown as though it comprises three different components, 5, 6 and 7, in fact during the diffusion bonding operation described below, the interfaces between the three components effectively disappear and the blade becomes a unitary, or integral, structure.

Figure 8:
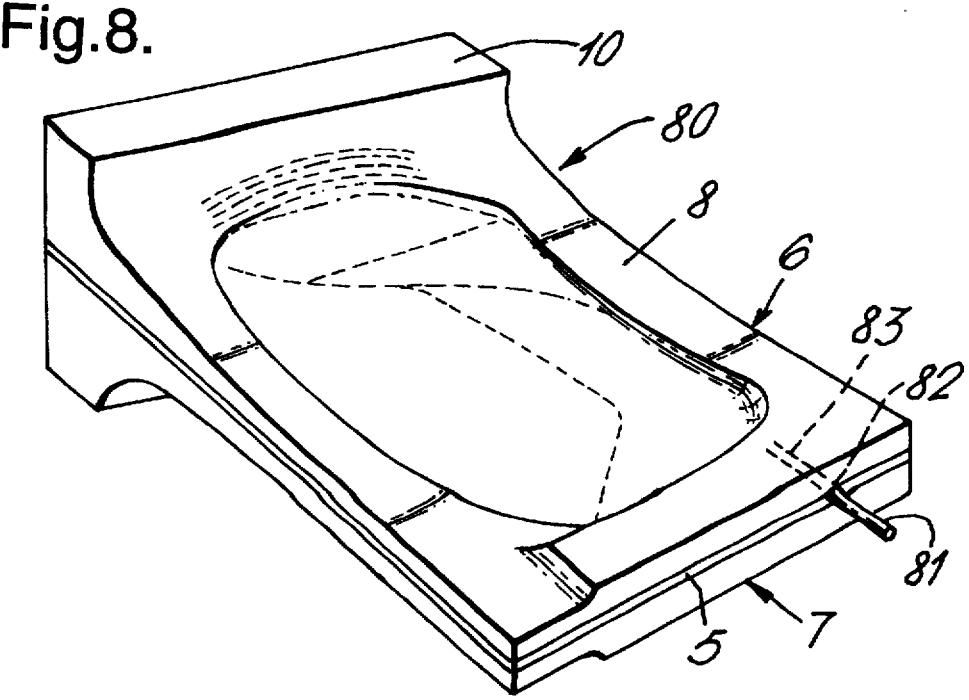

As already mentioned, the blade 1 is made by a route involving superplastic forming of a diffusion bonded blade preform, such as the preform 80 which is illustrated in FIG. 8. The diffusion bonding of the preform 80 occurs in selected places at the interfaces between the core sheet 5, before it is in its expanded state, and the blade flank components 6,7. This part of the process is described in more detail later.

Figure 2:
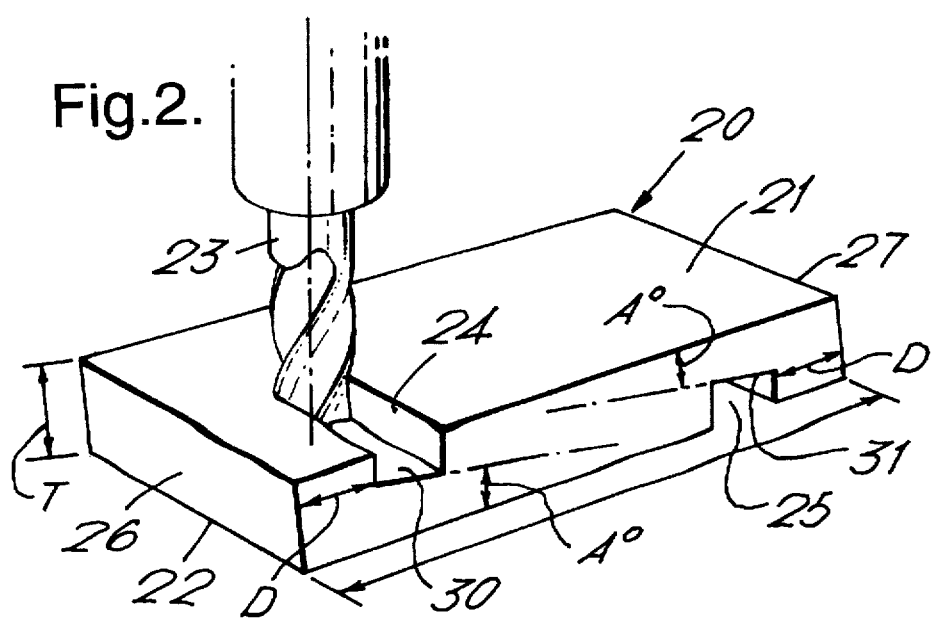
FIGS. 2 to 8 show stages in the production of a blade preform in accordance with the present invention.

Referring now to FIG. 2, the start of the manufacturing process for a blade preform, such as that shown in FIG. 8, is the production of pieces of plate metal alloy material 20. These will later form the blade flank components 6 and 7 of the finished blade shown in FIG. 1. A well known metal alloy which is particularly suitable for the production of high integrity fan blades by the diffusion bonding/superplastic forming route has a composition (in weight %) of approximately 6% aluminium, 4% vanadium, controlled very small amounts of other elements mainly resulting from processing, balance titanium.

The pieces 20 may be produced by cutting up rolled titanium plate material of thickness T into quadrilaterals or like figures. The rolling process results in pieces 20 whose top and bottom major faces 21, 22 are substantially plane and parallel to each other. After any necessary squaring up and cleaning, the faces 21,22 can be used as datums for subsequent machining seeps. Due to our chosen specific subsequent processing route, we prefer to cut the plate material into rectangles to produce rectangular prisms or parallelepipeds. Of course, the pieces do not have to be parallelepiped in shape if this is not required by the needs of subsequent stages in the process. However, thickness T of pieces 20 should correspond to at least the required maximum thickness of the root portions of the blade flank components 6,7, whereas its length L should be at least the required length of the blade flank components from root to tip.

Having obtained a parallelepiped piece 20, the first step in the preferred process is to utilise a router or end mill 23 to machine two channels 24,25 on each parallelepiped. One channel 24 is machined on the face 21 a distance D from the end 26 of the parallelepiped and the other channel 25 is machined the same distance D from its other end 27 on the opposite face 22 of the piece from the first channel 24. The channels 24,25 run widthwise of the parallelepiped 20 and in a preliminary way define the shoulders of the root portions 10,11 (FIG. 1) of the future blade flank components 6,7.

Figure 3:
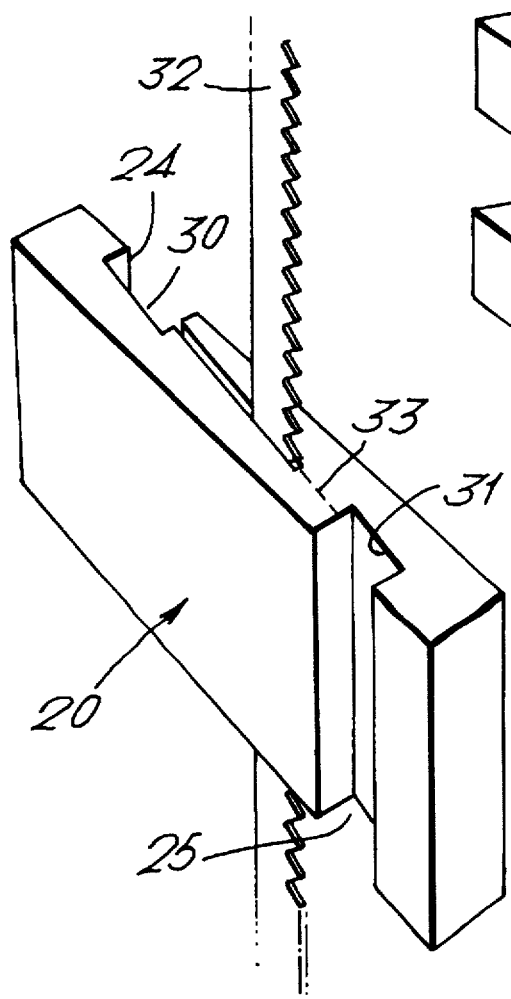
Figure 4:
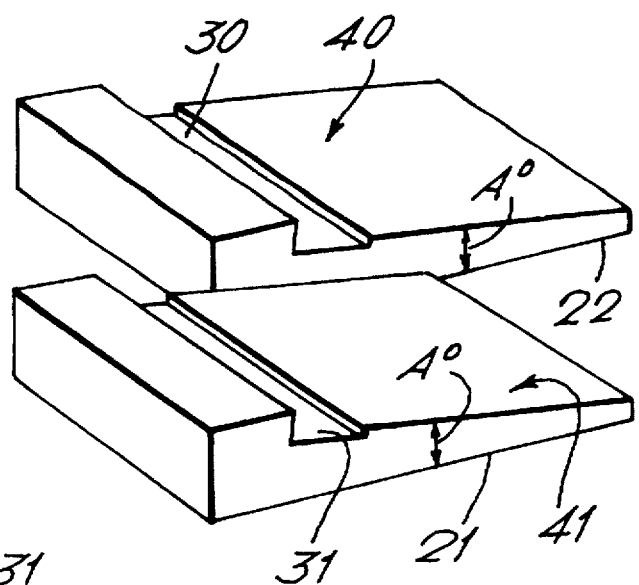

When cut, the channels 24,25 are of flat sided, flat bottomed section as shown in FIG. 3. The bottom faces 30,31 of the channels are inclined at an angle A° relative to the top and bottom faces 21,22 of the parallelepiped 20. The channels are wide enough to accommodate a band saw 32, which enters one of the channels 24, cuts the parallelepiped piece 20 lengthwise along an inclined plane 33 parallel to the channel bottom faces 30,31 and emerges into the other channel 25. This forms two separate identical longitudinally tapering panels 40,41, which are illustrated in FIG. 4. By virtue of the angle at which they were cut by the bandsaw, these panels taper longitudinally at an angle of A° over those portions of the panels which will become the aerofoil portions 8,9 of the blade flank components 6,7 shown in FIGS. 1 and 8.

It is not essential for the channels to be flat bottomed, all that is required is that the channels are large enough to enable the bandsaw blade to be inserted in the channels, and the side of the channel is perpendicular to the direction of the movement of the bandsaw, i.e. perpendicular to the plane 33.

Figure 5:
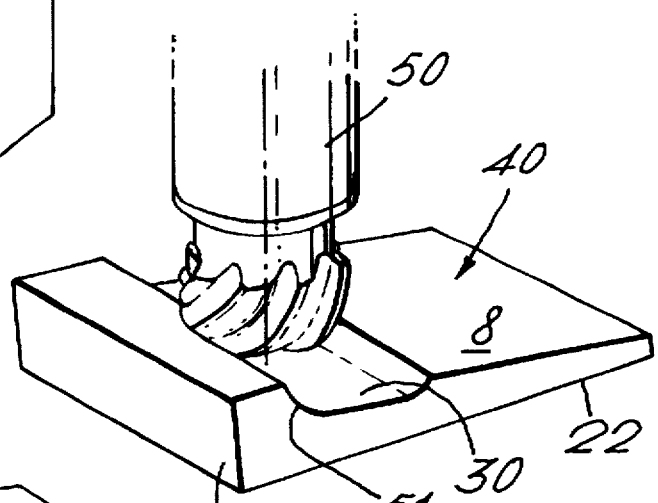
Figure 6:
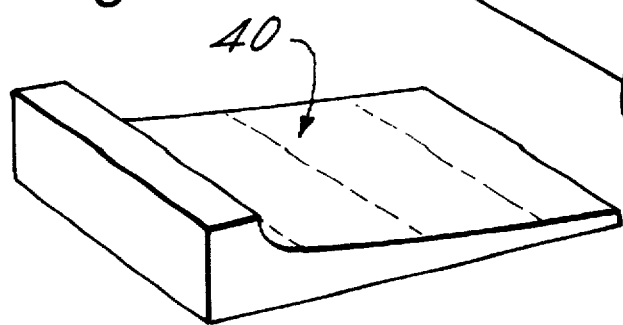
Figure 7:
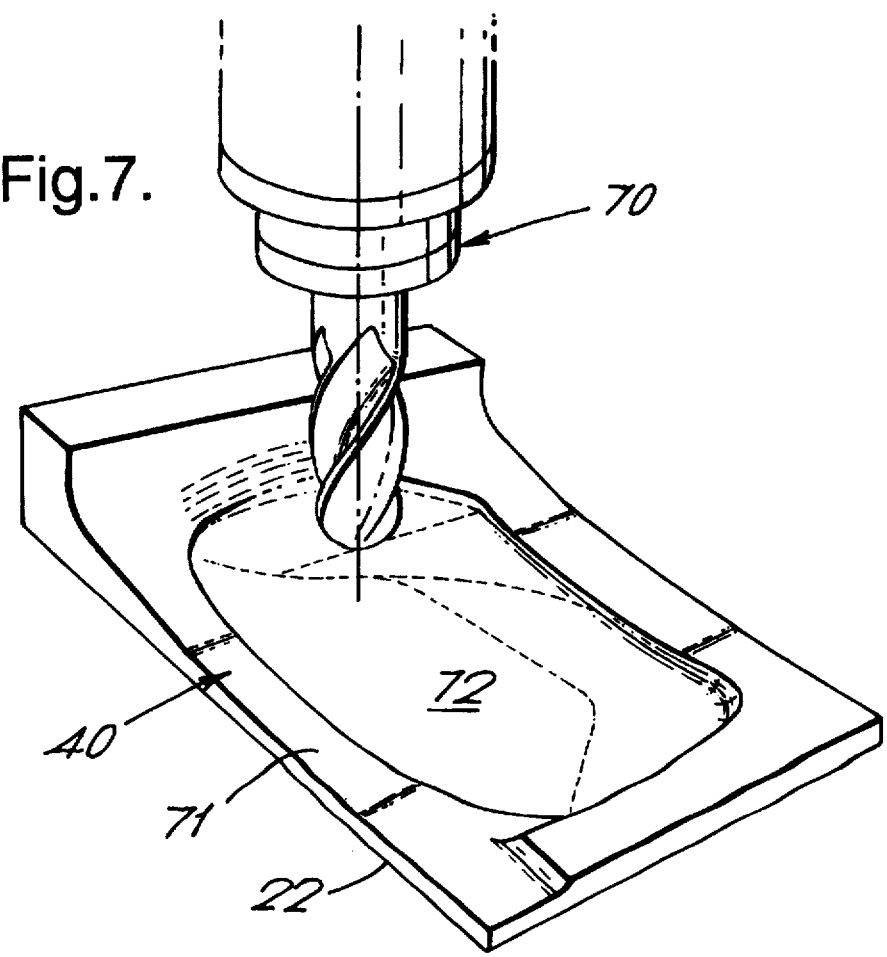

The next step in the process enables the production of blade preforms which do not require further machining before superplastic forming between dies. As shown in FIGS. 5 to 7, each tapered panel, e.g. 40, is form milled on its channel-bearing side so as to profile that side in three dimensions.

The first stage in profiling, shown in FIG. 5, is to use a form milling cutter 50 to enlarge the remains of the channel 24 in panel 40. The cutter 50 is shaped so as to produce a shoulder radius 51 at the transition between the aerofoil portion 8 and the root portion 10 of the preform 80 (FIG. 8) and to extend the bottom face 30 of the channel 24 further towards the tip end of the panel 40. Further form milling is performed as necessary to reduce the thickness of the remainder of the panel and produce an interim tapered profile, as shown in FIG. 6, over that portion of the panel which will become the aerofoil portion 8 of the blade flank component 6.

The second stage in profiling, shown in FIG. 7, is to use a variety of milling cutters, such as cutter 70, to complete the profiling process. These selectively remove additional material from parts of the tapered surface of the panel 40 to produce the finished blade flank component 6. The result is a thinner tapered edge portion 71 and a contoured pocket 72 in the tapered surface.

The next step in the process is to coat the faces 21,22 of the blade flank components 6,7 with a desired pattern of stop off material in order to define areas on these surfaces where diffusion bonding between them and the core layer 5 will not occur. The stop off keeps the confronting metal surfaces from making metallurgical contact with each other during the diffusion bonding process. A suitable material is powdered yttria in a binder and solvent, sold as e.g. "Stopyt 62A" by GTE Service Corporation of 100 Endicott Street, Danvers, Mass. 01923, USA. This enables the stop off pattern to be applied to the faces 21,22 by a simple screen printing process.

Pairs of the blade flank components 6,7 are then stacked together with the thinner core sheet 5 as indicated in FIG. 8. The core sheet is also produced by a rolling process with subsequent cleaning of the rolled surfaces. Accurate location of the three layers in the stack with respect to each other is achieved with the help of known types of location features. These may be dowels (not shown) penetrating edge parts of the stack which later in the blade manufacturing process will be trimmed off. It will be seen that the planar uncut stop off coated surfaces 21,22 confront each other, the core sheet 5 being interposed between them after it has been trimmed to the correct shape.

To complete the preform 80 of the finished blade shape, the edges of the three layers 5,6,7 in the stack are first welded to each other around the periphery of the stack so as to hermetically seal its interior. A suitable welding technique is TIG (Tungsten electrode/Inert Gas shield) welding around the exposed edges of the three layers in the stack. A small bore pipe 81 is then fitted to the edge of the stack by drilling out a small hole 82 and welding the pipe into it. Alternatively, an edge portion of the core sheet 5 and a confronting edge portion of one of the faces 21,22 of the blade flank components could be relieved to define between them a hole for receipt of the pipe. An end of the pipe could then be trapped in position between them during assembly of the stack. The pipe would then be welded into position at the same time as the edges of the components of the stack are welded together. In either case, the pipe in its hole connects to a groove 83 provided in the core sheet 5 and the groove in turn connects to an area of stop off material on one of the coated faces 21,22. In the design of the stack assembly it is ensured that all areas of stop off material are connected to the pipe 81 through other contiguous areas of stop off material, and/or through slots in the thickness of the core sheet 5.

On completion of preparations for the diffusion bonding step, the stack has been completely sealed about its periphery except for the inlet provided by the pipe 81. The assembly is then placed in an autoclave and heated to a temperature between 250° C. and 350° C. so as to "bake out" the solvent from the stop off material which was spread through the silk screen. This is done under continuous evacuation through the pipe 81 in order to ensure removal of contaminants which would be deleterious to the quality of the diffusion bonding process and the blade preform resulting from it.

Thereafter, the pipe is sealed to maintain a vacuum in the interior of the assembly while it is heated in the autoclave to a temperature between 900° C. and 950° C., preferably 925° C., and the argon pressure in the autoclave is raised to a pressure between 294 lbs/sq. in (20.26×10$^5$ Nm$^{-2}$) and 441 lbs/sq. in (30.39×10$^5$ Nm$^{-2}$ m). It is held at that temperature and pressure for about two hours. The temperature and pressure are then reduced to ambient and the assembly removed, diffusion bonding having been achieved in those areas where no stop off is present. By definition, the interfaces between the blade flank components 6,7 and the core layer 5 effectively disappear where successful diffusion bonding has occurred, leaving a unitary article with an internal structure defined by the pattern of stop off material. A blade preform 80, ready for subsequent superplastic forming, has now been produced.

Briefly described, the superplastic forming process involves heating the blade preform 80 to superplastic forming temperature and holding it between dies whose surfaces define a desired external shape for the blade. Those parts of its internal structure at the interfaces which have not been diffusion bonded together are expanded apart by injection of a suitable inert gas, such as argon, at high pressure into the interior of the blade through a new small bore pipe which is fitted in the same place as pipe 81. The blade flank components 6,7 are thus expanded outwards against the die surfaces and assume the desired shape. In so doing they pull with them those parts of the core sheet 5 to which they are bonded, so pulling it in opposite directions to expand it superplastically and form the desired expanded core structure. By virtue of expansion against the die surfaces, the external profiles of the blade flank components, including the contoured pockets 72, are transferred to the inside of the blade, thus producing the desired hollowness.

The expanded blade preform 80 can then be subjected to final trimming and machining operations to produce the finished blade.

In order to produce the twist in the aerofoil the integral structure produced during diffusion bonding is transferred to a twisting machine. The root of the blade is cambered and the aerofoil is twisted before the blade is superplastically expanded as described in our published European patent application 0568201A1, the contents of which are incorporated herein by reference, and this document should be consulted for a more complete description of the twisting procedure.

Although the above description has concentrated on the production of a blade preform comprising opposing blade flank components with a single core sheet between the two flank components, the invention can be readily applied to blade preforms without such a core sheet, where a finished hollow blade structure does not need cross-bracing by an expanded core structure. Clearly, the manufacturing process will be similar. However, the stop off material will be applied uniformly over a predetermined area of the uncut face of one of the blade flank components. This area of stop off will of course define the extent of the unbonded hollow interior of the aerofoil portion of the finished blade.

Figure 9:
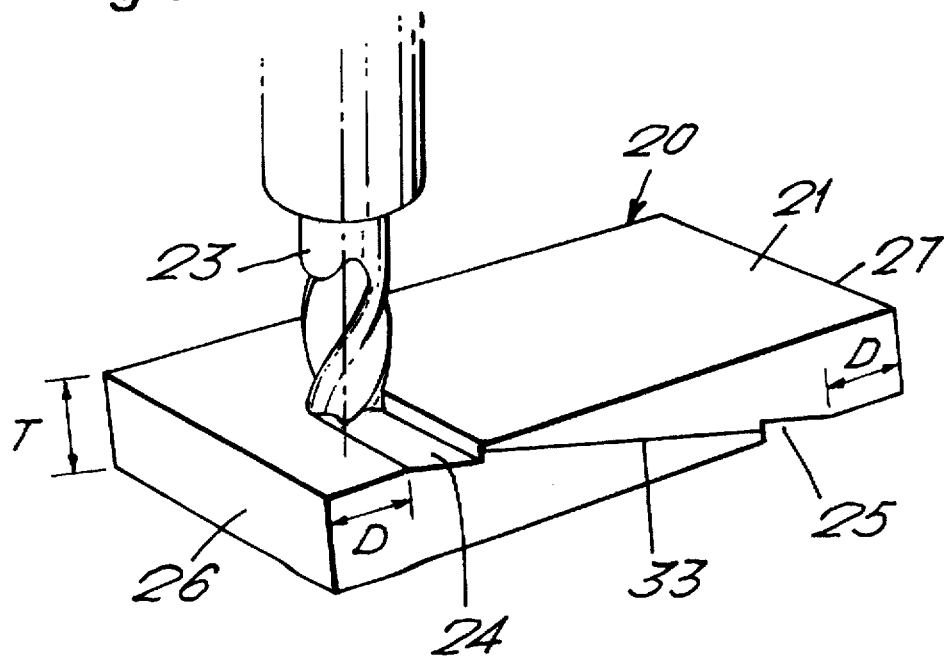
FIGS. 9 and 10 show an alternative way of producing the same blade preform.
Figure 10:
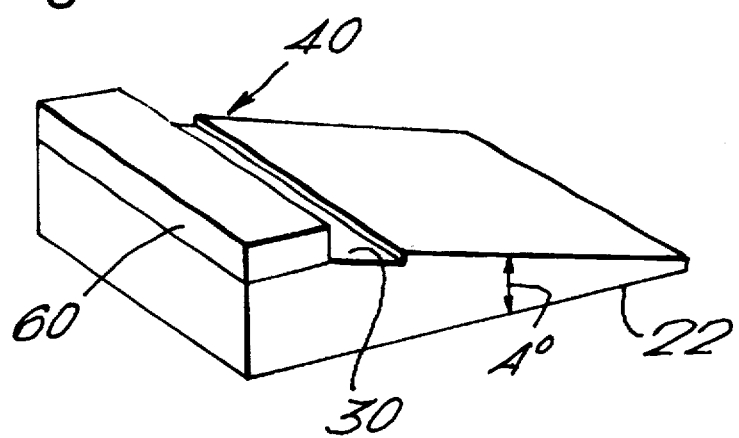

A further embodiment of the invention is shown in FIGS. 9 and 10 in which the thickness T of the pieces 20 of plate material is less than the maximum thickness of the root portions of the blade flank, the thickness T is greater than the blade flank thickness. Only a very small depth of channel 24,25 is cut into the faces 21,22 of the pieces 20 of material, or possibly no channel at all is cut into the faces 21,22. The bandsaw cuts the pieces 20 into two tapered pieces 40,41 either from the small channels or directly from the face 21. In this example it is necessary to provide additional blocks 50 of material to form the full thickness required for the root portions of the blade flanks. These additional blocks 50 of material are diffusion bonded to the pieces 40,41 at the ends 26,27 as shown in FIG. 10 during the diffusion bonding process to form integral roots.

The pieces 40 are assembled into the stack and are welded to each other around the periphery of the stack so as to hermetically seal its interior. A suitable welding technique is TIG (Tungsten electrode/Inert Gas shield) welding around the exposed edges of the three layers in the stack. A small bore pipe is then fitted to the edge of the stack by drilling out a small hole and welding the pipe into it. The blocks 50 are also assembled into the stack and the periphery of the blocks 50 is welded to the ends 26 and the space between the block 50 and piece 40 is hermetically sealed. The space between the blocks 50 and the pieces 40 is also evacuated either through a separate pipe or through a passage bored through the end 26 to connect with the main pipe to the space between the pieces 40. The advantage of this embodiment is that it is more economical with the use of material and it enables the use of thinner material which has improved mechanical properties.

Whereas the illustrated embodiment shows a manufacturing process in which the band saw cuts between channels machined in the sides of the parallelepipeds, it would clearly be within the ambit of the invention to cut along the entire length of appropriately sized panels with the band saw along an inclined plane and define the shoulders of the root portions subsequently if this is required.

Although the invention has referred to the use of a bandsaw to produce the two separate longitudinally tapering panels it would be equally possible to use wirecutting, electrodischarge machining or any other suitable method.

Although the invention has referred to the machining of pockets on the outer surfaces of the panels to subsequently form the hollow interior of the blade by the superplastic forming process, it would be equally possible to machine pockets on the inner surfaces of the panels to form the hollow interior of the blade simply by diffusion bonding the panels together, such as is described in U.S. Pat. No. 3,628,226 and U.S. Pat. No. 3,588,980.

I claim:

1. A manufacturing process for the production of a preform of a hollow aerofoil shaped blade, the preform being a diffusion bonded stack of metallic blade components including first and second blade flank components, each flank component comprising a root portion which in the finished blade serves for fixing the blade in a rotor disc and an aerofoil portion extending from the root portion to a radially outer tip, the process for producing the preforms comprising the steps of (a) producing pieces of metallic material in generally parallelepiped form, the parallelepipeds each having a length of at least the length of the preform from root to tip, (b) cutting each parallelepiped lengthwise along an inclined plane to form two separate panels of longitudinally tapering thickness, each panel having a cut surface and an uncut surface, (c) producing blade flank components from the panels by shaping the panels on their cut surfaces, or their uncut surfaces, to form a three dimensional profile thereon which in the finished blade will produce a hollow interior of the blade, (d) assembling the stack of blade components with the surfaces of the blade flank components which were uncut in step (b) facing each other, and (e) diffusion bonding the components in the stack together in a predefined bonding pattern thereby to create the blade preform with an internal structure defined by the bonding pattern.

2. A manufacturing process according to claim 1, in which there is an additional step between steps (a) and (b), comprising machining two channels on each parallelepiped, one channel being machined near each end of the parallelepiped on opposed sides thereof, the channels running widthwise of the parallelepiped thereby to preliminarily define the root portions of the blade flank components.

3. A manufacturing process according to claim 2, in which in step (b) a cutting means enters one of the channels, cuts the parallelepiped lengthwise along the inclined plane, and emerges into the other channel to complete the cutting step.

4. A manufacturing process according to claim 1, in which the parallelepipeds each have a thickness of at least the maximum thickness of the root portions of the blade flank components immediately before step (e).

5. A manufacturing process according to claim 1, in which the parallelepipeds each have a thickness of substantially less than half the thickness of the root portions of the preform after step (e).

6. A manufacturing process according to claim 5, in which at least one further component being assembled into the stack of blade components in step (d) to obtain the required thickness of the preform root portions, the at least one further component comprising at least one plate superimposed on the root portion of at least one of the blade flank components, the at least one plate being diffusion bonded to the root portion during step (e).

7. A manufacturing process according to claim 1 in which the cutting means is a band saw.

8. A manufacturing process according to claim 1, in which during step (d) a superplastically formable metallic sheet is placed between the two blade flank components, the blade flank components then being diffusion bonded to opposing sides of the sheet during step (e) thereby to produce blade preforms capable of being superplastically formed into a hollow blade with an expanded core structure for high strength and integrity.

9. A manufacturing process according to claim 1, in which there is an additional step between steps (c) and (d) comprising applying a stop off material in a predefined pattern to the uncut surface of at least one of the two blade flank components to prevent diffusion bonding of the uncut surfaces at regions other than the predefined bonding pattern.

10. A manufacturing process according to claim 1 including an additional step after step (e) of superplastically forming the blade preform to produce a hollow blade with an internal structure.

11. A manufacturing process for the production of a preform of a hollow aerofoil shaped blade, the preform being a diffusion bonded stack of metallic blade components including first and second blade flank components, each flank component comprising a root portion which in the finished blade serves for fixing the blade in a rotor disc and an aerofoil portion extending from the root portion to a radially outer tip, the process for producing the preforms comprising the steps of (a) producing pieces of metallic material in generally parallelepiped form, the parallelepipeds each having a length of at least the length of the preform from root to tip, (b) cutting each parallelepiped lengthwise along an inclined plane to form two separate longitudinally tapering panels, each panel having a cut surface and an uncut surface, (c) producing the blade flank components from two of the panels by shaping the panels on their cut surfaces to form a three dimensional profile thereon which in the finished blade will produce a hollow interior of the blade, (d) placing the blade flank components together in registration with each other to produce the stack of blade components, wherein the surfaces of the blade flank components which were uncut in step (b) face each other, and (e) diffusion bonding the components in the stack together in a predefined bonding pattern thereby to create the blade preform with an internal structure defined by the bonding pattern and which can be superplastically formed to produce the hollow aerofoil shaped blade.

12. A manufacturing process according to claim 11 including an additional step after step (e) of superplastically forming the blade preform to produce a hollow blade with an internal structure.

* * * * *